(12) United States Patent
Huang et al.

(10) Patent No.: US 10,212,567 B2
(45) Date of Patent: Feb. 19, 2019

(54) USER DEVICE, BASE DEVICE AND SYSTEM UTILIZING AUDIO SIGNAL TO TRANSMIT DATA, AND METHOD THEREOF

(71) Applicant: EASON TECH. CO., LTD., Taipei (TW)

(72) Inventors: Fu-Yu Huang, Taipei (TW); Min-Chun Lin, Taipei (TW); Feng-Hui Kuan, Taipei (TW)

(73) Assignee: Eason Tech. Co., Ltd., Taipei (TW)

( * ) Notice: Subject to any disclaimer, the term of this patent is extended or adjusted under 35 U.S.C. 154(b) by 527 days.

(21) Appl. No.: 13/663,526

(22) Filed: Oct. 30, 2012

(65) Prior Publication Data

US 2013/0110723 A1   May 2, 2013

Related U.S. Application Data

(60) Provisional application No. 61/554,061, filed on Nov. 1, 2011.

(51) Int. Cl.
*H04W 4/80* (2018.01)
*G06Q 10/10* (2012.01)

(52) U.S. Cl.
CPC ............. *H04W 4/80* (2018.02); *G06Q 10/10* (2013.01); *H04L 2209/60* (2013.01); *H04L 2209/805* (2013.01)

(58) Field of Classification Search
CPC ....... H04W 4/02; H04W 12/08; H04W 12/06; H04W 12/02; H04W 4/80; H04L 67/18; H04L 67/20; H04L 63/0492; H04L 9/3234; H04L 9/3247; H04L 9/3263; G06Q 10/10

USPC .......... 455/410, 41.1, 41.2, 456, 556.1, 415, 455/432.3, 456.5, 556.2, 558, 404.2, 455/456.3, 456.1, 39; 318/56
See application file for complete search history.

(56) References Cited

U.S. PATENT DOCUMENTS

| | | | |
|---|---|---|---|
| 8,494,176 B2 | 7/2013 | Suzuki et al. | |
| 2003/0055792 A1 | 3/2003 | Kinoshita et al. | |
| 2003/0182555 A1* | 9/2003 | Labaton | ..................... 713/176 |
| 2004/0003260 A1* | 1/2004 | Hawkes | ............. G06F 21/6209 |
| | | | 713/185 |
| 2008/0077799 A1* | 3/2008 | Labaton | ..................... 713/184 |
| 2010/0053169 A1* | 3/2010 | Cook | ......................... 345/440.1 |
| 2010/0256976 A1* | 10/2010 | Atsmon | ................. G06F 21/34 |
| | | | 704/231 |
| 2011/0290874 A1* | 12/2011 | Tang et al. | .................... 235/379 |

* cited by examiner

*Primary Examiner* — Yogeshkumar Patel
(74) *Attorney, Agent, or Firm* — Alan D. Kamrath; Kamrath IP Lawfirm, P.A.

(57) ABSTRACT

A method of utilizing an audio signal to transmit data for conducting electronic transactions includes in a user device, converting user identification data into a first audio signal and transmitting the first audio signal to a base device; in the base device, converting the first audio signal into the user identification data; in the base device, transmitting the user identification data and transaction content to a server device; and in the server device, obtaining authorization of a validation entity by utilizing the user identification data and the transaction content, for obtaining a transaction number and transmitting the transaction number to the base device.

28 Claims, 7 Drawing Sheets

USER DEVICE, BASE DEVICE AND SYSTEM UTILIZING AUDIO SIGNAL TO TRANSMIT DATA, AND METHOD THEREOF

FIELD OF THE INVENTION

The present invention is related to an electronic transaction system, and particularly, to an electronic transaction system which utilizes an audio signal to transmit data and the method thereof.

BACKGROUND OF THE INVENTION

Conventionally, there are a number of existing methods to embed data in physical environments. For instance, QR codes are a method for embedding a URL or other data in a pictograph or a diagram. Users can obtain the embedded URL by reading the pictograph or diagram of the QR code.

Another method is to utilize Radio Frequency Identification (RFID) for embedding a tag or code in a physical device (e.g. user device). The tag or the code can be read passively by a RFID reader, when the physical device is close to the RFID reader (e.g. base device), for interactions such as money transactions, etc.

Recently, another technology called Near-Field-Communications (NFC) has an advantage in the ability to mimic a RFID tag in a physical device (e.g. user device) which can be read by a conventional RFID reader (e.g. base device). However, one drawback is that the physical device (e.g. user device) is still required to be modified for NFC technology to mimic a RFID tag in the modified physical device (e.g. user device). Therefore, certain limitations still exist for current NFC technology, and consequently, NFC has not been able to gain significant popularity.

SUMMARY OF THE INVENTION

An embodiment of the present invention discloses a user device which utilizes an audio signal to transmit data. The user device includes a storage module, a data/audio conversion module, an audio transmission module and a control module. The storage module is for storing user identification data. The data/audio conversion module is for converting the user identification data into a first audio signal. The audio transmission module is for transmitting the first audio signal. The control module is for controlling the storage module, the data/audio conversion module and the audio transmission module.

Another embodiment of the present invention discloses a base device which utilizes an audio signal to transmit data. The base device includes an audio reception module, an audio/data conversion module, an internet module and a control module. The audio reception module is for receiving a first audio signal. The audio/data conversion module is for converting the first audio signal into user identification data. The internet module is for transmitting the user identification data and transaction content to a server device via the internet, so as to obtain a transaction number. The control module is for controlling the audio reception module, the audio/data conversion module and the internet module.

Another embodiment of the present invention discloses a user device which utilizes an audio signal to transmit data. The user device includes a storage module, an audio reception module, an audio/data conversion module, an internet module and a control module. The storage module is for storing user identification data. The audio reception module is for receiving a first audio signal. The audio/data conversion module is for converting the first audio signal into transaction content. The internet module is for transmitting the user identification data and the transaction content to a server device via the internet. The control module is for controlling the storage module, the audio reception module, the audio/data conversion module and the internet module.

Another embodiment of the present invention discloses a base device which utilizes an audio signal to transmit data. The base device includes a data/audio conversion module, an audio transmission module and a control module. The data/audio conversion module is for converting transaction content into a first audio signal. The audio transmission module is for transmitting the first audio signal. The control module is for controlling the data/audio conversion module and the audio transmission module.

Another embodiment of the present invention discloses a system which utilizes an audio signal to transmit data. The system includes a user device, a base device and a server device. The user device is for providing user identification data. The base device is for providing transaction content. The server device is for providing a transaction number. Communication between the user device and the base device is accomplished via audio. Communication between the user device and the server device is accomplished via the internet. Communication between the base device and the server device is accomplished via the internet. After the server device obtains authorization from a validation entity according to the user identification data and the transaction content, the server device provides the transaction number to the user device or the base device.

Another embodiment of the present invention discloses a method which utilizes an audio signal to transmit data. The method includes, in a user device, converting user identification data into a first audio signal and transmitting the first audio signal to a base device, in the base device, converting the first audio signal into the user identification data, in the base device, transmitting the user identification data and transaction content to a server device, and in the server device, obtaining authorization of a validation entity by utilizing the user identification data and the transaction content, for obtaining a transaction number and transmitting the transaction number to the base device.

Another embodiment of the present invention discloses a method which utilizes an audio signal to transmit data. The method includes in a base device, converting transaction content into a first audio signal and transmitting the first audio signal to a user device, in the user device, receiving the first audio signal and converting the first audio signal into transaction content, in the user device, transmitting user identification data and the transaction content to a server device, and in the server device, obtaining authorization of a validation entity by utilizing the user identification data and the transaction content, for obtaining a transaction number and transmitting the transaction number to the user device.

These and other objectives of the present invention will no doubt become obvious to those of ordinary skill in the art after reading the following detailed description of the preferred embodiments that are illustrated in the various figures and drawings.

DETAILED DESCRIPTION OF THE INVENTION

Therefore, the present invention provides a method which allows data communication between the user device and the base device to conduct an electronic transaction, without requiring the user device or the base device to be modified.

Figure 1:
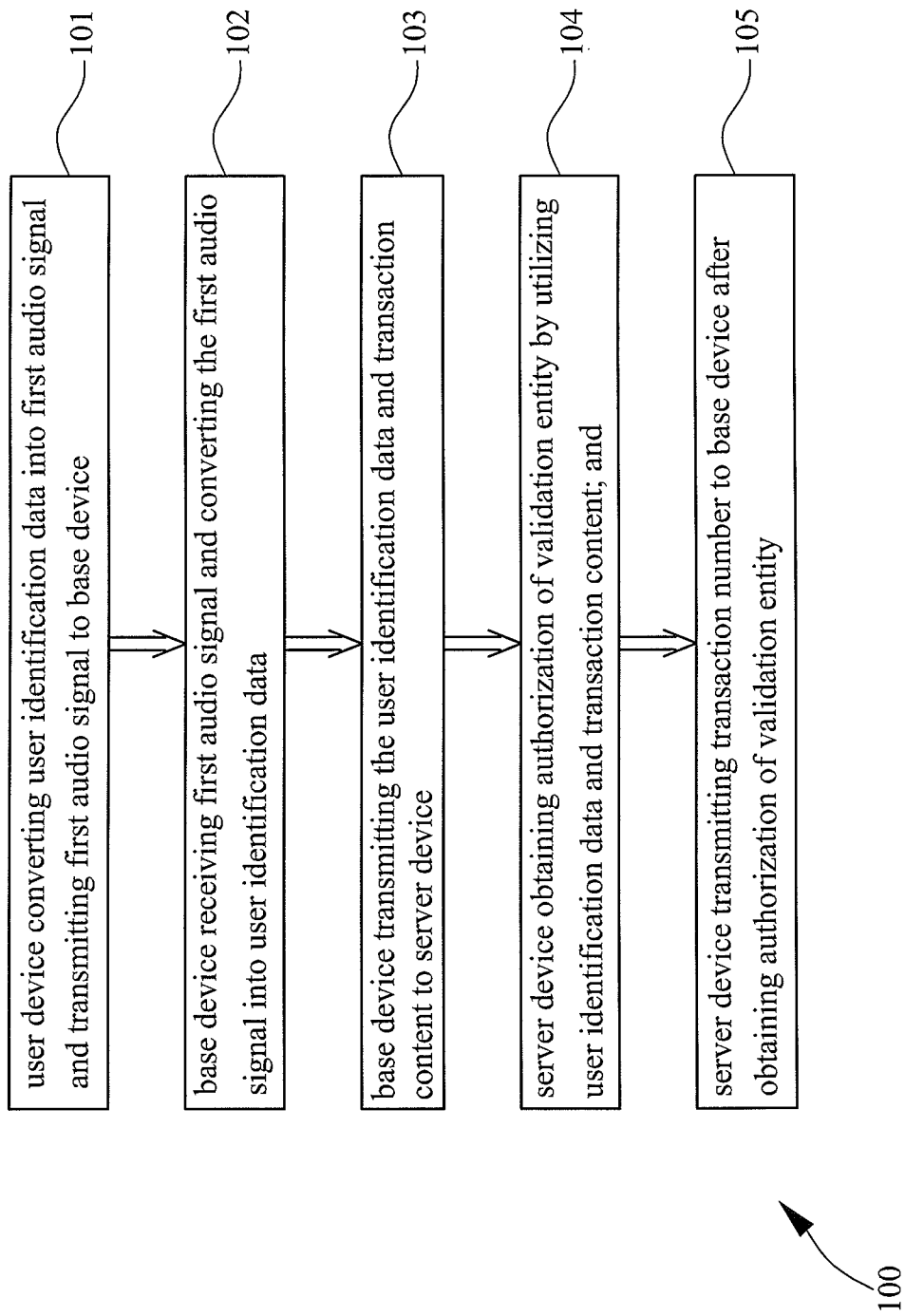
FIG. 1 is a diagram illustrating a method of utilizing an audio signal to transmit data according to a first embodiment of the present invention.

Please refer to FIG. 1. FIG. 1 is a diagram illustrating a method 100 of utilizing an audio signal to transmit data according to a first embodiment of the present invention. Steps of method 100 include:

Step 101: a user device converting user identification data into a first audio signal and transmitting the first audio signal to a base device;

Step 102: the base device receiving the first audio signal and converting the first audio signal into the user identification data;

Step 103: the base device transmitting the user identification data and transaction content to a server device;

Step 104: the server device obtaining authorization of a validation entity by utilizing the user identification data and the transaction content; and Step 105: the server device transmitting a transaction number to the base device after obtaining the authorization of the validation entity.

For easy understanding, one preferred embodiment of an operational environment of the method 100 can be exemplified as follows: the user device can be a mobile device (such as a mobile phone or a tablet PC, etc.), the base device can be a Point of Sale (POI) (such as a mobile phone, a tablet PC or a cash register, etc.) in a store, and the server device can include a server or a plurality of servers. When performing the method 100, transmission of the audio signal can be carried out by approaching the user device close to the base device. For instance, when a user has made purchases and wishes to check out, the user can put his mobile phone close to the cash register in the store, for transmitting audio signals between the mobile phone and the cash register.

In step 101, the user device converts user identification data into a first audio signal and transmits the first audio signal to the base device. For instance, the user device can convert the user identification data into the first audio signal via a data/audio conversion module, and transmits the first audio signal via an audio transmission module (such as a speaker) outputting sound. This way, in step 102, the base device can receive the first audio signal via an audio reception module (such as a microphone), and then converts (or reverts) the first audio signal into the user identification data. An advantage of this method is that the user can quickly and conveniently input the user identification data to the base device, meaning the corresponding audio signal can be transmitted to the base device by utilizing only the relative facilities of the user device, so as to save input time. Also, since an audio signal is highly directive and possesses a high degree of attenuation, a distance between the user device and the base device must be less than a predetermined range when the user is to perform step 101 and step 102. This way, security of the transaction can be ensured (i.e. the audio signal is received only by the corresponding base device), and the user can be ensured for communicating with the corresponding/desired base device.

In step 103, the base device can transmit the user identification data and transaction content to the server device. One way for the base device to transmit data to the server device is via the internet. The transaction content can be, for instance, a transaction amount, a transaction item, cost of each transaction item, a total transaction amount, etc. The user identification data can be, for instance, an account name of the user registered for the server device, a password corresponding to the account name or credit card information (such as credit card number, expiry date, security code and phone number), etc. A preferred embodiment is that a user can register a user account for the server device in advance, and can provide the server device credit card information corresponding to the user account. This way, the user device only requires converting the registered user account into an audio signal and transmits the audio signal to the base device. The base device can then perform transmission to the server device according to the user account obtained. Afterward, the server device can then obtain the corresponding credit card information according to the user account received. Step 104 can then proceed.

In step 104, the server device can then provide the user identification data and the transaction content to a validation entity, for confirming authorization. The validation entity can be, for instance, a bank. If authorization is successful, meaning credit card information of the user is valid and the validation entity approves the transaction content, step 105 can then proceed. The server device then provides a transaction number to the base device, completing the transaction.

Furthermore, after step 105 is performed, meaning the base device has obtained the transaction number, the base device can then print out the corresponding transaction (i.e. include transaction number, transaction amount, transaction item, cost of each transaction item . . . , etc.) for the user to keep as a receipt. Alternatively, the base device can also convert the transaction number into a second audio signal and transmits the second audio signal to the user device according to methods described in step 101 and step 102. This way, the user device can store the transaction number and conveniently logs into the server device to obtain the transaction content corresponding to the transaction number. The server device can also transmit the transaction number to the user device via the internet during or after step 105.

Figure 2:
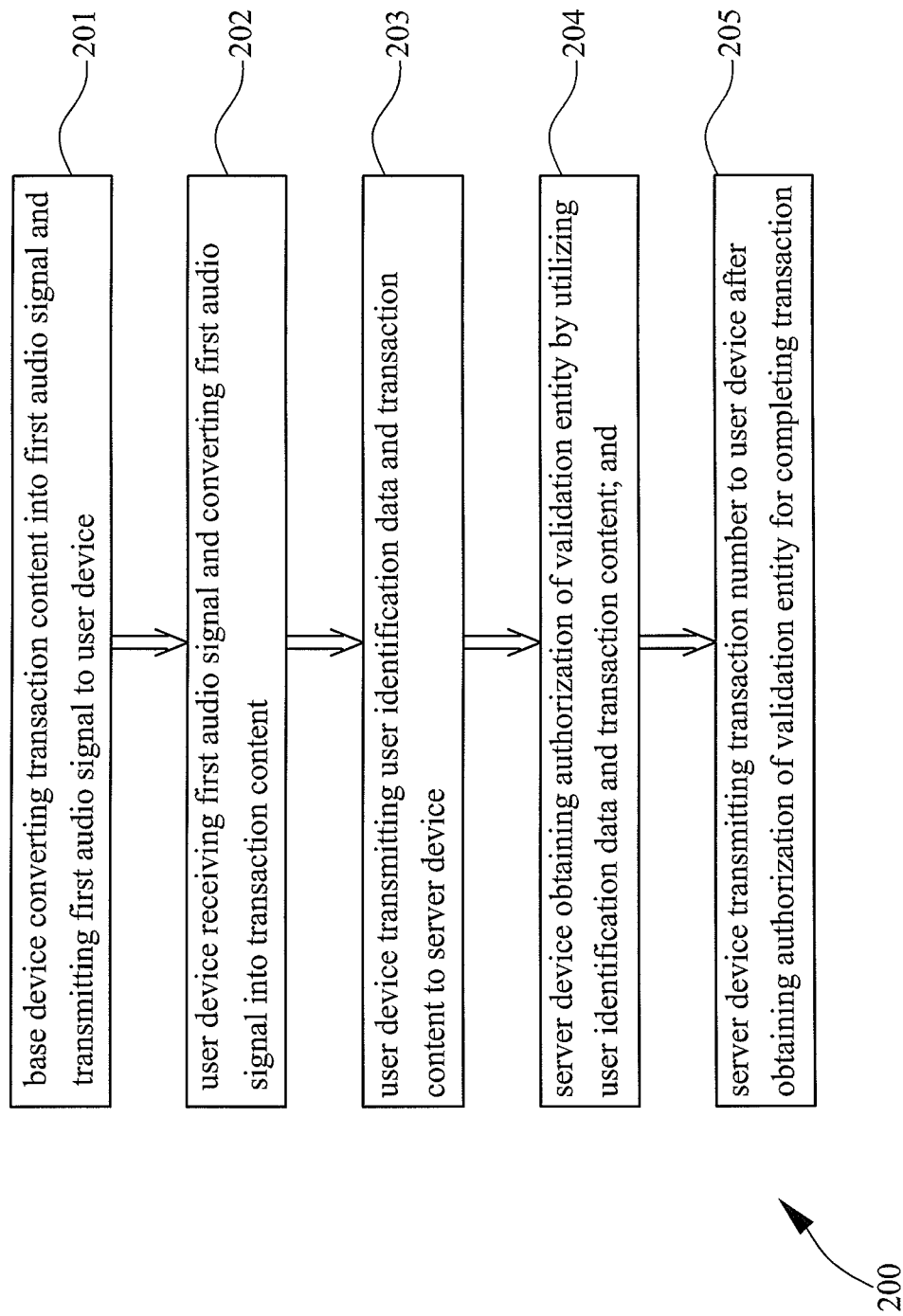
FIG. 2 is a diagram illustrating a method of utilizing an audio signal to transmit data according to a second embodiment of the present invention.

Please refer to FIG. 2. FIG. 2 is a diagram illustrating a method 200 of utilizing an audio signal to transmit data according to a second embodiment of the present invention. Steps of method 200 include:

Step 201: a base device converting transaction content into a first audio signal and transmitting the first audio signal to a user device;

Step 202: the user device receiving the first audio signal and converting the first audio signal into the transaction content;

Step 203: the user device transmitting user identification data and the transaction content to a server device;

Step 204: the server device obtaining authorization of a validation entity by utilizing the user identification data and the transaction content; and Step 205: the server device transmitting a transaction number to the user device after obtaining authorization of the validation entity for completing the transaction.

For easy understanding, one preferred embodiment of the operational environment of the method 200 can be exemplified as follows: the user device can be a mobile device (such as a mobile phone, a tablet PC, etc.), the base device can be a Point of Sale (POI) (such as a mobile phone, a tablet PC, a cash register, etc.) in a store, and the server device can include a server or a plurality of servers. When performing the method 200, transmission of the audio signal can be carried out by approaching the user device close to the base device. For instance, when a user has made purchases and wishes to check out, the user can put his mobile phone close to the cash register in the store, for transmitting audio signals between the mobile phone and the cash register.

In step 201, the base device converts transaction content into a first audio signal and transmits the first audio signal to the user device. For instance, the base device can convert the transaction content into the first audio signal via a data/audio conversion module, and transmits the first audio signal via an audio transmission module (such as a speaker) outputting sound. This way, in step 202, the user device can receive the first audio signal via an audio reception module (such as a microphone), and then converts (or reverts) the first audio signal into the transaction content.

In step 203, the user device can transmit user identification data and the transaction content to the server device. One way for the user device to transmit data to the server device is via the internet. The transaction content can be, for instance, transaction amount, a transaction item, a cost of each transaction item, a total transaction amount, etc. The user identification data can be, for instance, an account name of the user registered for the server device, a password corresponding to the account name, or credit card information (such as credit card number, expiry date, security code and phone number), etc. A preferred embodiment is that a user can register a user account for the server device in advance, and can provide the server device credit card information corresponding to the user account. This way, in step 203, the user device only requires transmitting the registered user account to the server device. The server device can then obtain the corresponding credit card information according to the received user account. Step 204 can then proceed.

In step 204, the server device can then provide the user identification data and the transaction content to a validation entity, for confirming authorization. The validation entity can be, for instance, a bank. If authorization is successful, meaning the credit card information of the user is valid and the validation entity approves the transaction content, step 105 can then proceed. The server device then provides a transaction number to the user device, completing the transaction.

Furthermore, after step 205 is performed, meaning the user device has obtained the transaction number, the user device can convert the transaction number into a second audio signal and can transmit the second audio signal to the base device, according to the methods of step 201 and step 202. This way, the base device can store the transaction number and can confirm the transaction has been completed.

The server device can also transmit the transaction number to the base device via the internet during or after step 205.

An advantage of the method 200 of utilizing an audio signal to transmit data of the present invention is that the user is not required to provide the user identification data (such as user account, credit card information . . . , etc.) to the base device. In other words, data being communicated between the base device and the user device only includes the transaction number and the transaction content, so information related to the user is not revealed. This way, security of the transaction can be ensured (i.e. information related to the user is transmitted only between the user device and the server device), and transaction duration can be reduced by utilizing an audio signal.

According to the above description, the method 100 and the method 200 of utilizing an audio signal to transmit data for conducting an electronic transaction of the present invention can effectively allow the user device to conduct an electronic transaction with the base device, reducing the transaction duration and also increasing the transaction security.

Figure 3:
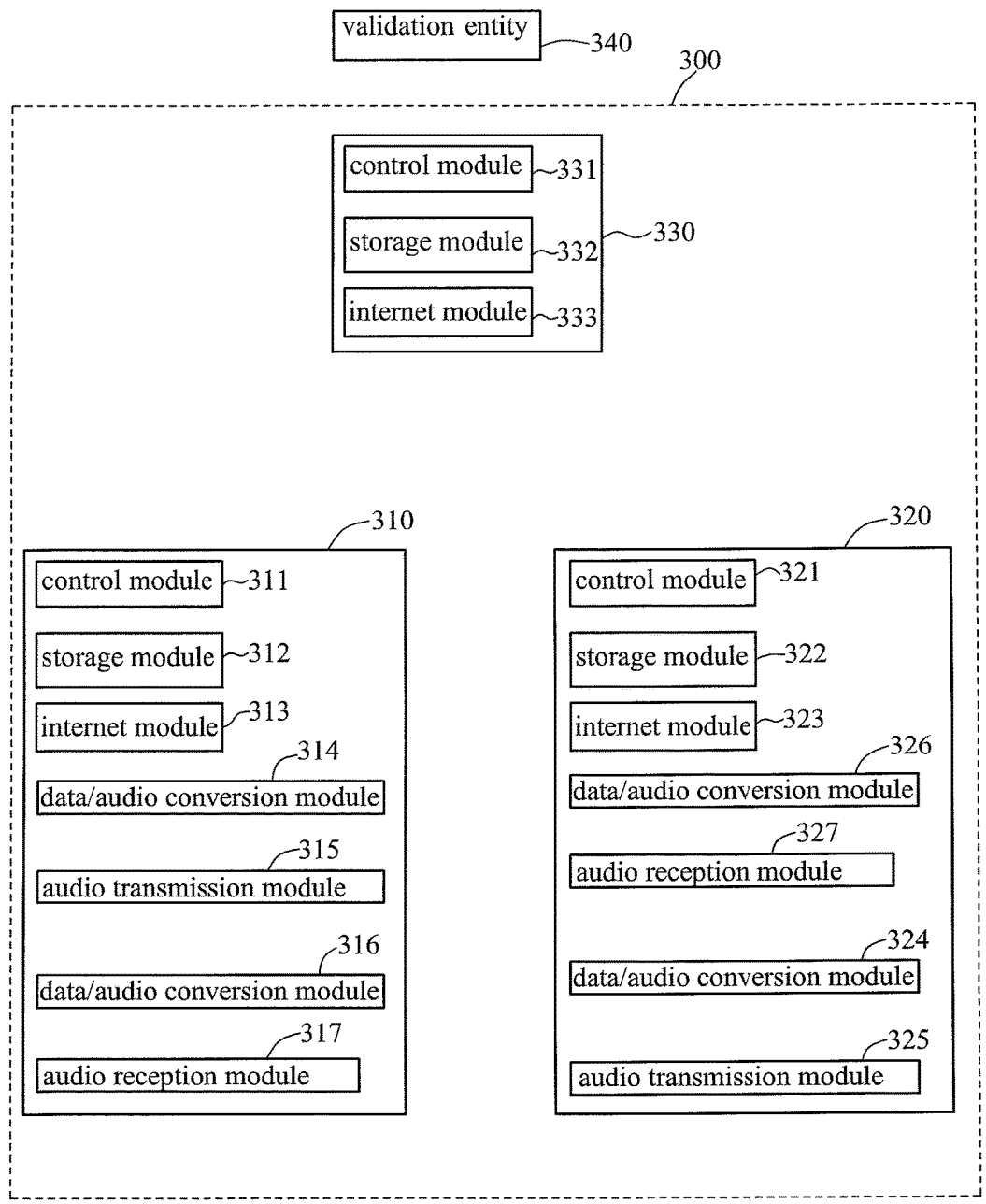
FIG. 3 is a diagram illustrating an electronic transaction system utilizing an audio signal to transmit data for conducting electronic transactions according to an embodiment of the present invention.

Please refer to FIG. 3. FIG. 3 is a diagram illustrating an electronic transaction system 300 utilizing an audio signal to transmit data for conducting electronic transactions according to an embodiment of the present invention. As shown in FIG. 3, the electronic transaction system 300 includes a user device 310, a base device 320 and a server device 330. A purpose of the user device 310 is to provide user identification data, a purpose of the base device 320 is to provide transaction content, and a purpose of the server device 330 is to provide a transaction number. Communication between the user device 310 and the base device 320 can be accomplished via audio, communication between the user device 310 and the server device 330 can be accomplished via the internet, and communication between the base device 320 and the server device 330 can also be accomplished via the internet. The server device 330 requests authorization from a validation entity 340, according to the user identification data and the transaction content, and provides the transaction number to the user device 310 or the base device 320.

The user device 310 includes a control module 311, a storage module 312, an internet module 313, a data/audio conversion module 314, an audio transmission module 315, an audio/data conversion module 316 and an audio reception module 317. The base device 320 includes a control module 321, a storage module 322, an internet module 323, a data/audio conversion module 324, an audio transmission module 325, an audio/data conversion module 326 and an audio reception module 327. The server device 330 includes a control module 331, a storage module 332 and an internet module 333. For instance, the user device 310 and the base device 320 can be a mobile phone or a tablet PC, the audio transmission module 315/325 can be a speaker equipped on the corresponding mobile phone or tablet PC, and the audio reception module 317/327 can be a microphone equipped on the corresponding mobile phone or tablet PC. Further, in a preferred embodiment of the present invention, a frequency range of the audio signal can be 200 Hertz (Hz)~20 k Hz (depending on the reception frequency limitation of the microphone).

In the user device 310, the storage module 312 can be utilized to store the user identification data, the transaction content, the transaction number, etc. The internet module 313 can be utilized to communicate with the server device 330. The data/audio conversion module 314 can be utilized to convert data (such as user identification data) of the storage module 312 into an audio signal. The audio transmission module 315 can be utilized to transmit the audio signal converted by the data/audio conversion module 314. The audio reception module 317 can be utilized to receive an audio signal. The audio/data conversion module 316 can be utilized to convert the audio signal received by the audio reception module 317 to data and the data can be stored in the storage module 312. Further, the control module 311 can be utilized to control the storage module 312, the internet module 313, the data/audio conversion module 314, the audio transmission module 315, the audio/data conversion module 316, and the audio reception module 317.

In the base device 320, the storage module 322 can be utilized to store the user identification data, the transaction content, the transaction number, etc. The internet module 323 can be utilized to communicate with the server device 330. The data/audio conversion module 324 can be utilized to convert data (such as transaction number) of the storage module 322 into an audio signal. The audio transmission module 325 can be utilized to transmit the audio signal converted by the data/audio conversion module 324. The audio reception module 327 can be utilized to receive an audio signal. The audio/data conversion module 326 can be utilized to convert the audio signal received by the audio reception module 327 to data, and the data can be stored in the storage module 312. Further, the control module 321 can be utilized to control the storage module 322, the internet module 323, the data/audio conversion module 324, the audio transmission module 325, the audio/data conversion module 326, and the audio reception module 327.

In the server device 330, the storage module 332 can be utilized to store the user identification data, the transaction content, the transaction number, etc. Preferably, the storage module 332 is utilized to store the user account and the corresponding financial information (such as credit card information corresponding to the user account). The internet module 333 can be utilized to communicate with the user device 310 and the base device 320. The internet module 333 can also communicate with the validation entity 340 for obtaining authorization. Further, the control module 331 can be utilized to control the storage module 332 and the internet module 333.

Figure 4:
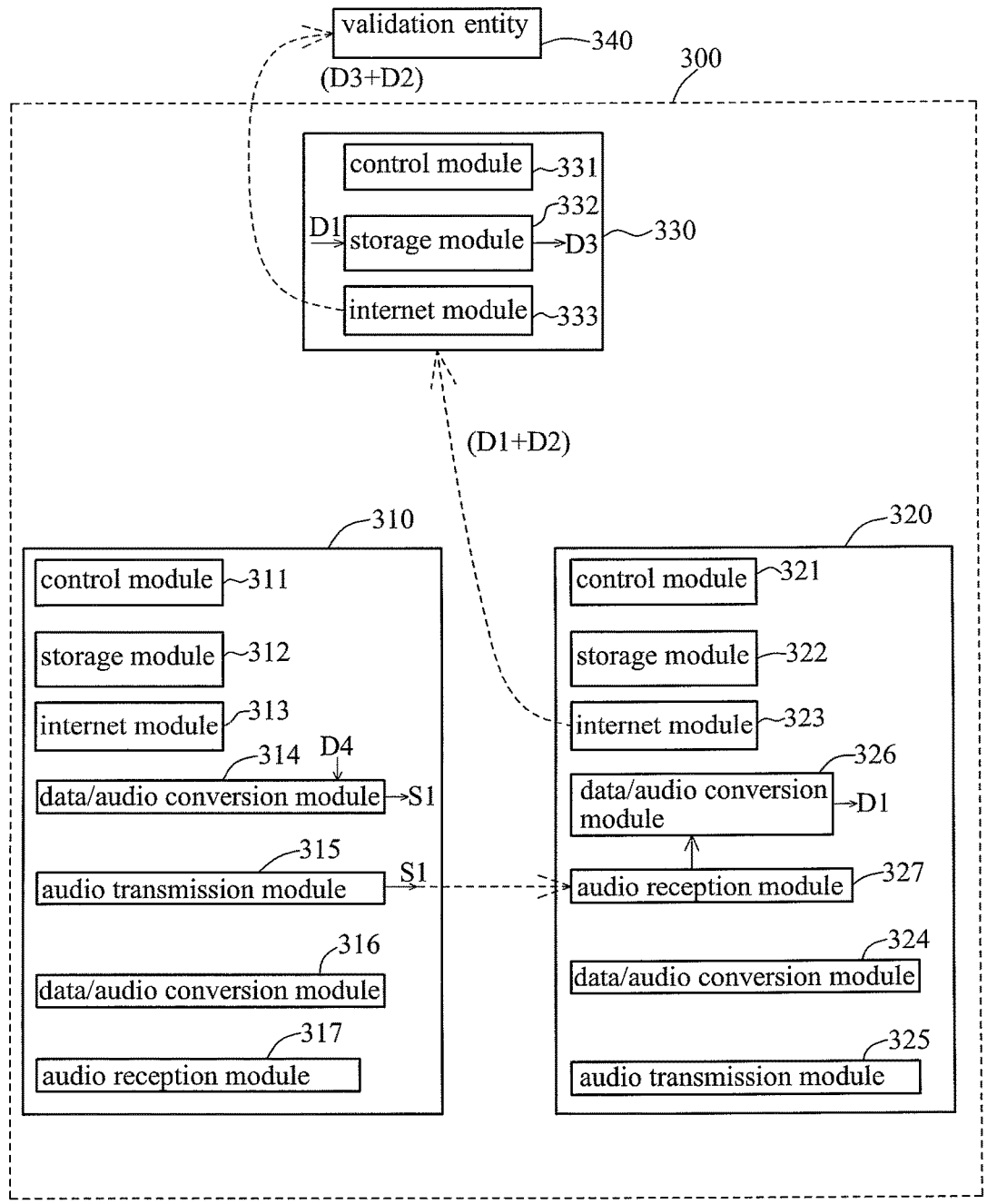
FIG. 4 and FIG. 5 are diagrams illustrating how the electronic transaction system which utilizes an audio signal to transmit data for conducting an electronic transaction can apply to the method of the first embodiment of the present invention.
Figure 5:
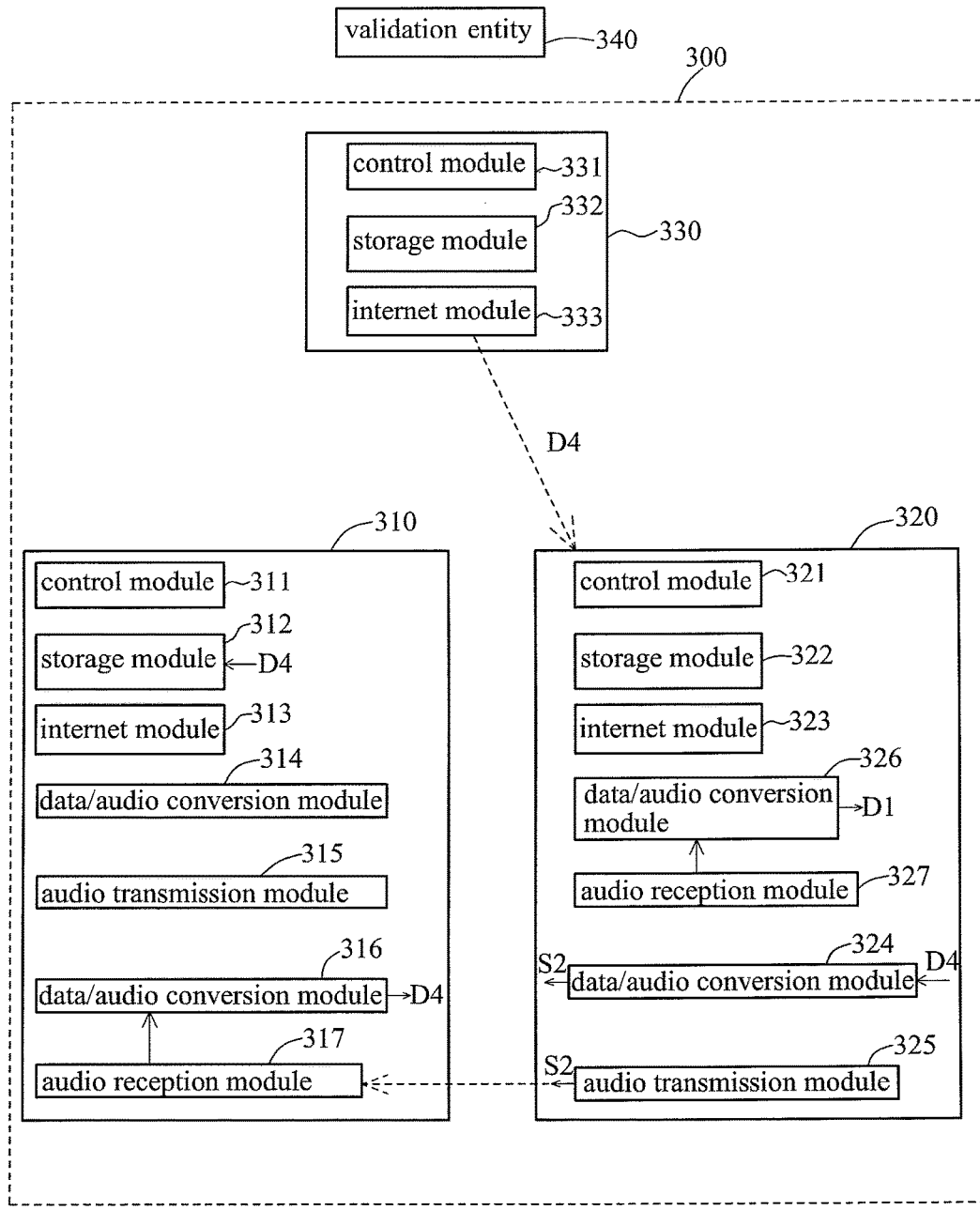

Please refer to FIG. 4 and FIG. 5. FIG. 4 and FIG. 5 are diagrams illustrating how the electronic transaction system 300 which utilizes an audio signal to transmit data for conducting an electronic transaction can apply to the method 100 of the first embodiment of the present invention. Details are as follows.

Please refer to FIG. 4. When a user is to utilize the electronic transaction system 300 for electronic transactions, the user can employ user identification data D1 stored in the storage module 312 of the user device 310 to generate a first audio signal S1 via conversion of the data/audio conversion module 314. The audio transmission module 314 then transmits the first audio signal S1 to the audio reception module 327 of the base device 320. The audio reception module 327 receives the first audio signal S1 and transmits the first audio signal S1 to the audio/data conversion module 326. The audio/data conversion module 326 then converts the first audio signal S1 to the user identification data. Afterwards, the base device 320 then transmits the user identification data D1 and the transaction content D2 to the server device 330 via the internet through the internet module 323. The server device 330 locates corresponding financial data D3 (such as credit card information) in the storage module 332 according to the user identification data D1 obtained, and then transmits the financial data D3 and the transaction content D2 to the validation entity 340 via the internet through the internet module 333.

For ensuring transaction security, the server device 330 can include a plurality of servers, where one particular server stores credit card information only while another server stores the corresponding security codes only. Alternatively, a security code of a credit card may not be stored in the server device 330. Hence, in this case, the user device 310 can manually input a security code corresponding to a credit card to the base device 320, and then transmit the security code to the server device 330 via the internet through the internet module 323, so the server device 330 can then transmit the security code to the validation entity 340 for obtaining authorization. On the other hand, the user device 310 can store a security code corresponding to a credit card in the storage module 312, and at the same time converting the security code into an audio signal. The user device 310 then transmits the audio signal to the base device 320 for the base device 320 to transmit the security code to the server device 330 via the internet, so the server device 330 can then transmit the security code to the validation entity 340 for obtaining authorization.

Please refer to FIG. 5. After obtaining authorization from the validation entity 340, the server device 330 transmits a transaction number D4 to the base device 320 via the internet through the internet module 333. When the base device 320 receives the transaction number D4, the transaction is deemed complete. The base device 320 can then convert the transaction number D4 into a second audio signal S2 via the data/audio conversion module 324. The audio transmission module 325 then transmits the second audio signal S2 to the audio reception module 317 of the user device 310. The audio/data conversion module 316 converts the received second audio signal S2 into the transaction number D4 and stores the transaction number D4 in the storage module 312. This way, in the future, the user device 310 can inquire with the server device 330 for transaction content corresponding to the transaction number D4 via the internet.

Figure 6:
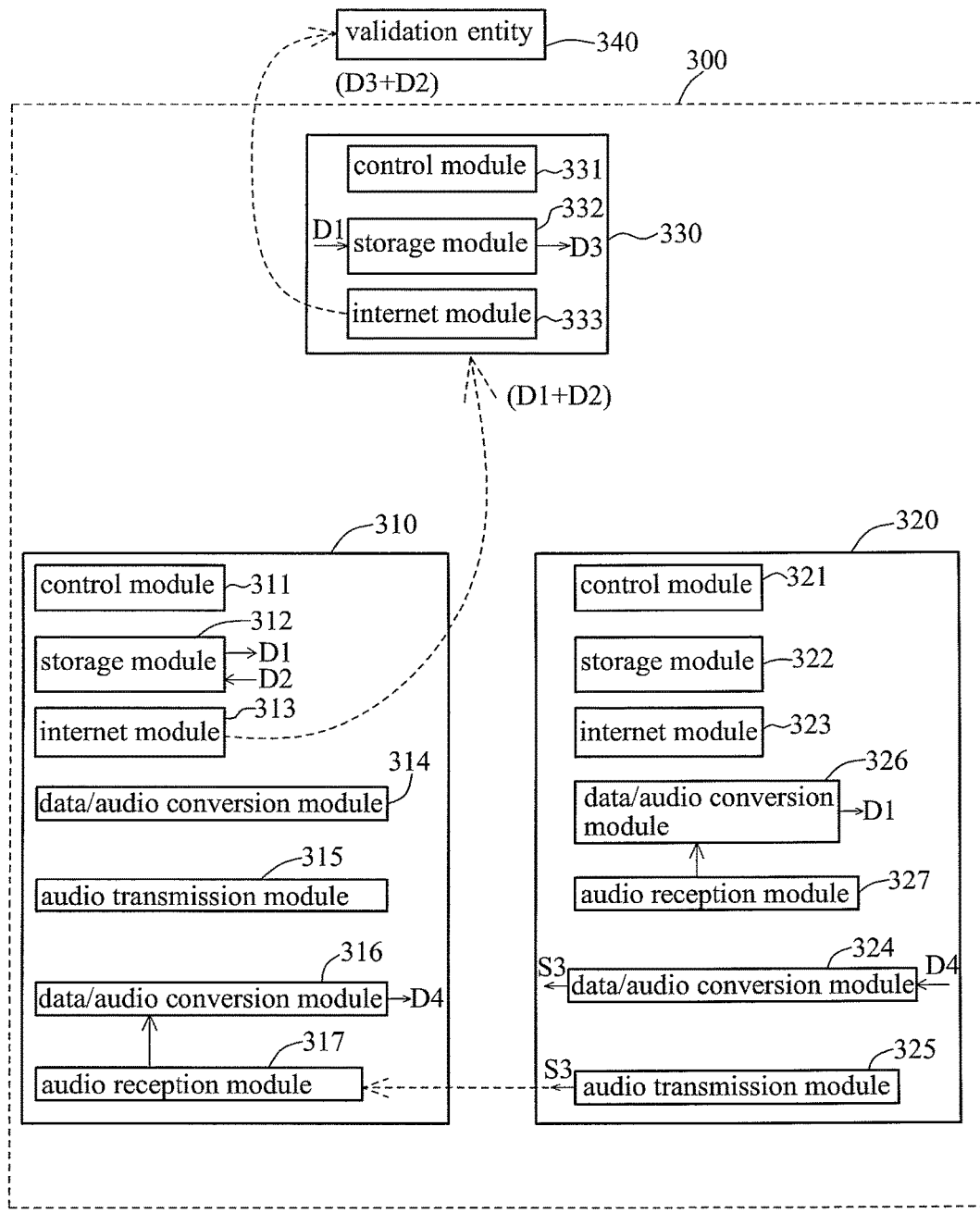
FIG. 6 and FIG. 7 are diagrams illustrating how the electronic transaction system which utilizes an audio signal to transmit data for conducting an electronic transaction can apply to the method of the second embodiment of the present invention.
Figure 7:
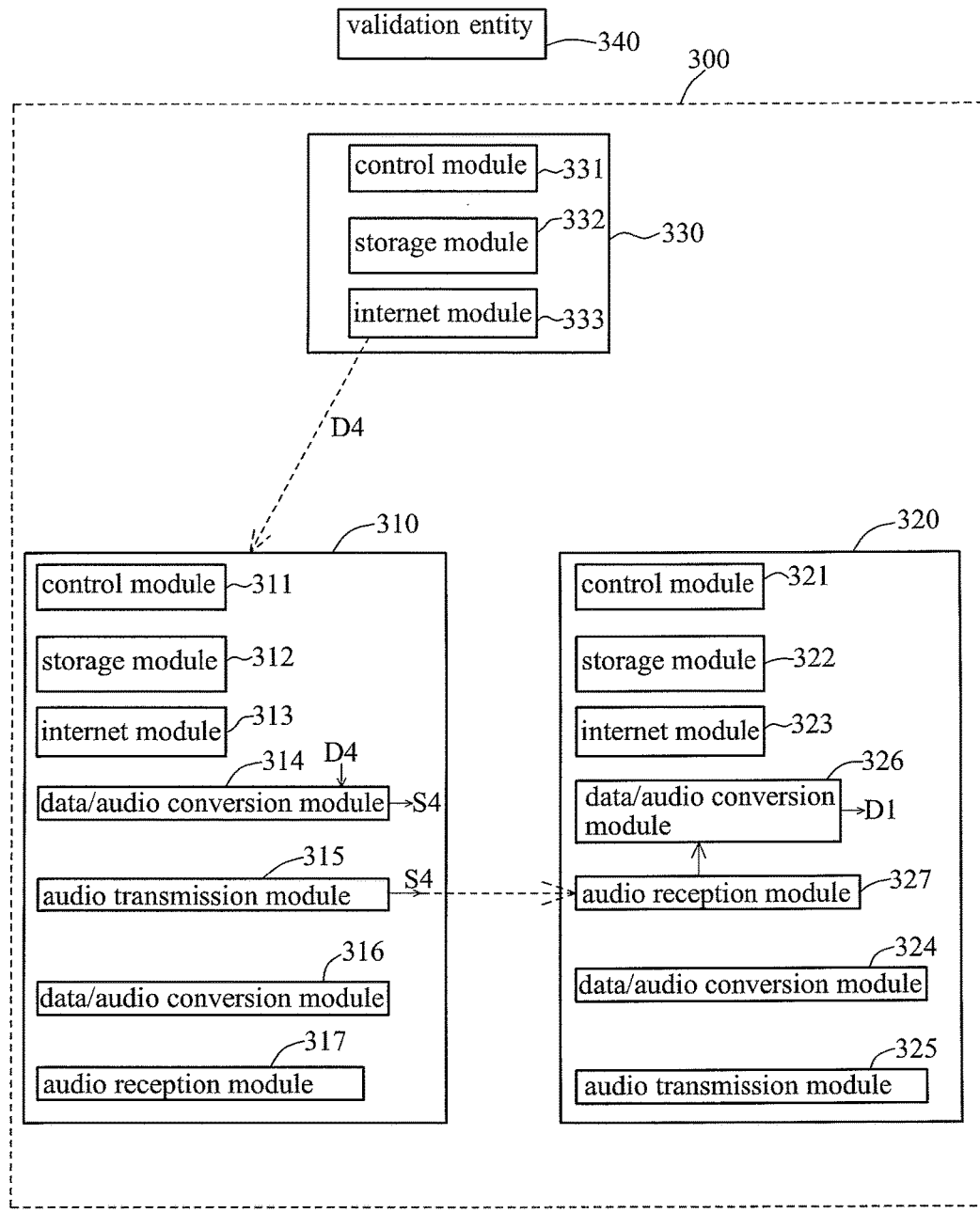

Please refer to FIG. 6 and FIG. 7. FIG. 6 and FIG. 7 are diagrams illustrating how the electronic transaction system 300 which utilizes an audio signal to transmit data for conducting an electronic transaction can apply the method 200 of the second embodiment of the present invention. Details are as follows.

Please refer to FIG. 6. When a user is to utilize the electronic transaction system 300 for electronic transactions, the base device 320 can first convert the transaction content D2 into a third audio signal S3 via the data/audio conversion module 324. The audio transmission module 325 transmits the third audio signal S3 to the user device 310. The audio reception module 317 of the user device 310 receives the third audio signal S3. The audio/data conversion module 316 converts the third audio signal S3 into the transaction content D2. In a preferred embodiment, the transaction content D2 can be stored in the storage module 312. Afterwards, the user can then employ and transmit the user identification data D1 stored in the storage module 312 of the user device 310 and the received transaction content D2 to the server device 330 via the internet through the internet module 313. The server device 330 can then locate corresponding financial data D3 (such as credit card information) in the storage device 332 according to the user identification data D1 obtained, and then transmit the financial data D3 and the transaction content D2 to the validation entity 340 via the internet through the internet module 333.

For ensuring transaction security, the security code of a credit card may not be stored in the server device 330. Hence, in this case, the user device 310 can manually input the security code corresponding to a credit card to the base device 320, and then transmit the security code to the server device 330 via the internet, so the server device 330 can then transmit the security code to the validation entity 340 to obtain authorization. On the other hand, the user device 310 can store the security code corresponding to a credit card in the storage module 312, and, in this case, transmit the security code to the validation entity 340 through the server device 330 via the internet, for obtaining authorization.

Please refer to FIG. 7. After obtaining authorization from the validation entity 340, the server device 330 transmits a transaction number D4 to the user device 310 via the internet through the internet module 333. When the user device 310 receives the transaction number D4, the user device 310 can convert the transaction number D4 into a fourth audio signal S4 via the data/audio conversion module 314. The audio transmission module 315 then transmits the fourth audio signal S4 to the base device 320 to complete the transaction. More specifically, the audio reception module 327 of the base device 320 receives the fourth audio signal S4. The audio/data conversion module 326 converts the fourth audio signal S4 into the transaction number D4 and stores the transaction number D4 in the storage module 322 to complete the transaction.

In the present invention, the conversion from data to an audio signal can be done through a specific coding mechanism, and the conversion from the audio signal to data can also be done through this specific coding mechanism. This way, both the encoding end and the decoding end of the data transmission can obtain correct data without errors.

In summary, the method of utilizing an audio signal to transmit data for conducting electronic transactions of the present invention allows a user to conduct electronic transactions directly without requiring modification of the user device and the base device, consequently lowering threshold for system applications. Hence, a user can apply the disclosure of the present invention more extensively to various types of electronic transactions. In addition, by utilizing characteristics of an audio signal, which is highly directive and possesses a high degree of attenuation, the method of utilizing an audio signal to transmit data for conducting electronic transactions of the present invention can increase transaction security, providing more convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A user device utilizing at least one audio signal to transmit data, comprising:
   a storage module configured to store user identification data;
   a data/audio conversion module configured to convert the user identification data into a first audio signal;
   an audio transmission module configured to transmit the first audio signal;
   an audio reception module configured to receive a second audio signal after the first audio signal is transmitted, the second audio signal confirming authorization of the user identification data and transaction content in the first audio signal;
   an audio/data conversion module configured to convert the second audio signal into a transaction number; and
   a control module configured to control the storage module, the data/audio conversion module, the audio transmission module, the audio reception module and the audio/data conversion module.

2. The user device of claim 1, wherein a base device receives the first audio signal transmitted by the audio transmission module of the user device and converts the first audio signal to the user identification data.

3. The user device of claim 2, wherein the base device transmits the user identification data and transaction content to a server device, for obtaining a transaction number.

4. The user device of claim 3, wherein the base device converts the transaction number into the second audio signal and transmits the second audio signal to the user device.

5. The user device of claim 3, the base device further comprising an internet module, wherein the server device transmits the transaction number to the internet module of the base device via internet.

6. A base device utilizing at least one audio signal to transmit data, comprising:
   audio reception means for receiving a first audio signal;
   audio/data conversion means for converting the first audio signal into user identification data;
   internet communication means for transmitting the user identification data and transaction content to a server device via internet, so as to obtain a transaction number;
   data/audio conversion means for converting the transaction number into a second audio signal after obtaining the transaction number from the server device, the second audio signal confirming authorization of the user identification data and transaction content in the first audio signal;
   audio transmission means for transmitting the second audio signal; and
   control means for controlling the storage means, the audio reception means, the audio/data conversion means, the data/audio conversion means, the audio transmission means and the internet communication means.

7. A user device utilizing at least one audio signal to transmit data, comprising:
   a storage module for storing user identification data;
   an audio reception module for receiving a first audio signal;
   an audio/data conversion module for converting the first audio signal into transaction content;
   an internet module for transmitting the user identification data and the transaction content to a server device via internet, so as to obtain a transaction number;
   a data/audio conversion module for converting the transaction number into a second audio signal after the first audio signal received, the second audio signal confirming authorization of the user identification data and transaction content in the first audio signal;
   an audio transmission module for transmitting the second audio signal; and
   a control module for controlling the storage module, the audio reception module, the audio/data conversion module, the internet module, the data/audio conversion module and the audio transmission module.

8. The user device of claim 7, wherein after the internet module has transmitted the user identification data and the transaction content, the user device obtains a transaction number.

9. A base device utilizing at least one audio signal to transmit data, comprising:
- a storage module for storing a transaction content and a transaction number;
- a data/audio conversion module for converting transaction content into a first audio signal;
- an audio transmission module for transmitting the first audio signal;
- an audio reception module for receiving a second audio signal after the first audio signal is transmitted, the second audio signal confirming authorization of user identification data and the transaction content in the first audio signal;
- an audio/data conversion module for converting the second audio signal into the transaction number and saving the transaction number to the storage module; and
- a control module for controlling the storage module, the data/audio conversion module, the audio transmission module, the audio reception module and the audio/data conversion module.

10. The base device of claim 9, wherein a user device receives the first audio signal, and the user device converts the first audio signal into the transaction content.

11. The base device of claim 10, wherein the user device transmits user identification data and the transaction content to a server device, for obtaining a transaction number.

12. The base device of claim 11, wherein the user device then converts the transaction number into a second audio signal and transmits the second audio signal.

13. The base device of claim 11, further comprising an internet module, wherein the server device transmits the transaction number to the internet module of the base device via internet.

14. A system utilizing at least one audio signal to transmit data, comprising:
- a user device for providing user identification data;
- a base device for providing transaction content; and
- a server device for providing a transaction number;
- wherein the identification data is converted into a first audio signal and transmitted to the base device by the user device;
- wherein communication between the user device and the base device is accomplished via audio, communication between the user device and the server device is accomplished via internet and communication between the base device and the server device is accomplished via internet;
- wherein after the server device receives the user identification data and the transaction content, the server device provides the transaction number to the base device;
- wherein the transaction number is converted into a second audio signal and transmitted to the user device by the base device after the base device receives the transaction number, the second audio signal confirming authorization of the user identification data and transaction content in the first audio signal.

15. The system of claim 14, wherein the user device comprises:
- a storage module for storing the user identification data and the transaction number;
- a data/audio conversion module for converting the user identification data into a first audio signal;
- an audio transmission module for transmitting the first audio signal to the base device;
- an audio reception module for receiving the second audio signal;
- an audio/data conversion module, for converting the second audio signal into the transaction number; and
- a control module for controlling the storage module, the data/audio conversion module, the audio transmission module, the audio reception module and the audio/data conversion module.

16. The system of claim 14, wherein the base device comprises:
- a storage module for storing the transaction content;
- an audio reception module for receiving the first audio signal;
- an audio/data conversion module for converting the first audio signal into the user identification data;
- an internet module for transmitting the user identification data and the transaction content to the server device via internet, so as to obtain the transaction number;
- a data/audio conversion module for converting the transaction number into the second audio signal;
- an audio transmission module for transmitting the second audio signal to the user device; and
- a control module for controlling the audio reception module, the audio/data conversion module, the internet module, the data/audio conversion module and the audio transmission module.

17. The system of claim 16, wherein the server device obtains corresponding credit card information according to the user identification data, the server device provides the corresponding credit card information to the validation entity for obtaining authorization, after obtaining authorization from the validation entity the server device provides the transaction number to the base device via internet.

18. The system of claim 14, wherein the server obtains authorization from a validation entity according to the user identification data and the transaction content, and the server device provides the transaction number to the base device.

19. A method of utilizing an audio signal to transmit data, comprising:
- in a user device, converting user identification data into a first audio signal and transmitting the first audio signal to a base device;
- in the base device, converting the first audio signal into the user identification data;
- in the base device, transmitting the user identification data and transaction content to a server device;
- in the server device, receiving the user identification data and the transaction content, for obtaining a transaction number and transmitting the transaction number to the base device, and
- in a base device, converting the received transaction number into a second audio signal and transmitting the second audio signal to the user device after the base device receives the transaction number.

20. The method of claim 19, wherein in the server device, obtaining authorization of a validation entity by utilizing the user identification data and the transaction content, for obtaining the transaction number and transmitting the transaction number to the base device comprises in the server device, utilizing the user identification data to obtain credit card information, and utilizing the credit card information and the transaction content to obtain authorization of the validation entity, so as to obtain the transaction number and then transmit the transaction number to the base device.

21. A method of utilizing an audio signal to transmit data, comprising:
- in a base device, converting transaction content into a first audio signal and transmitting the first audio signal to a user device;

in the user device, receiving the first audio signal and converting the first audio signal into transaction content;

in the user device, transmitting user identification data and the transaction content to a server device;

in the server device, receiving the user identification data and the transaction content, obtaining a transaction number and transmitting the transaction number to the user device; and in the user device, converting the transaction number into a second audio signal and transmitting the second audio signal to the base device after the user device has received the transaction number.

22. The method of claim 21, wherein in the server device, obtaining authorization of the validation entity by utilizing the user identification data and the transaction content, and wherein obtaining the transaction number and transmitting the transaction number to the user device comprises:

in the server device, utilizing the user identification data to obtain credit card information, and utilizing the credit card information and the transaction content to obtain authorization of the validation entity, so as to obtain the transaction number and then transmit the transaction number to the user device.

23. A system utilizing an audio signal to transmit data, comprising:

a user device for providing user identification data;

a base device for providing transaction content; and a server device for providing a transaction number;

wherein communication between the user device and the base device is accomplished via audio, communication between the user device and the server device is accomplished via internet and communication between the base device and the server device is accomplished via internet;

wherein the transaction content is converted into a first audio signal and transmitted to the user device by the base device;

wherein after the server device receives the user identification data and the transaction content from the user device, the server device provides the transaction number to the user device;

wherein the transaction number is converted into a second audio signal, the second audio signal confirming authorization of the user identification data and transaction content in the first audio signal, and is transmitted to the base device by the user device after the user device receives the transaction number.

24. The system of claim 23, wherein:

the base device comprises:

a storage module for storing the transaction content and the transaction number;

a data/audio conversion module for converting the transaction content into a first audio signal;

an audio transmission module for transmitting the first audio signal to the user device;

an audio reception module for receiving the second audio signal;

an audio/data conversion module, for converting the second audio signal into the transaction number; and a control module for controlling the storage module, the data/audio conversion module, the audio transmission module, the audio reception module and an audio/data conversion module.

25. The system of claim 23, wherein:

the user device comprises:

a storage module for storing the user identification data;

an audio reception module, for receiving the first audio signal;

an audio/data conversion module for converting the first audio signal into the transaction content;

an internet module for transmitting the user identification data and the transaction content to the server device via internet, so as to obtain the transaction number;

a data/audio conversion module for converting the transaction number into the second audio signal;

an audio transmission module for transmitting the second audio signal to the user device; and a control module for controlling the audio reception module, the audio/data conversion module, the internet module, the data/audio conversion module and the audio transmission module.

26. The system of claim 25, wherein the server device obtains corresponding credit card information according to the user identification data, the server device provides the corresponding credit card information to the validation entity for obtaining authorization, after obtaining authorization from the validation entity the server device provides the transaction number to the internet module of the user device via internet.

27. The system of claim 23, wherein after the server device obtains authorization from a validation entity according to the user identification data and the transaction content, the server device provides the transaction number to the base device.

28. The user device of claim 3, wherein the transaction number is saved in the storage module of the user device when the second audio signal is converted the transaction number.

* * * * *